United States Patent [19]

Masaki et al.

[11] Patent Number: 5,677,604
[45] Date of Patent: Oct. 14, 1997

[54] CONTROL SYSTEM AND CONTROL METHOD FOR ELECTRIC AUTOMOBILE

[75] Inventors: Ryoso Masaki, Hitachi; Nobuyoshi Mutoh, Katsuta; Satoru Kaneko, Hitachi; Sanshiro Obara, Tokai-mura, all of Japan

[73] Assignee: Hitachi, Ltd., Japan

[21] Appl. No.: 225,297

[22] Filed: Apr. 8, 1994

[30] Foreign Application Priority Data

Apr. 9, 1993 [JP] Japan ................................. 5-083288

[51] Int. Cl.⁶ ........................................................ H02P 3/00
[52] U.S. Cl. ................................ 318/139; 318/801; 361/31
[58] Field of Search ............................... 318/139, 434, 318/799–815; 361/23, 24, 30, 31, 87, 93; 363/40, 41, 50, 52, 53, 55, 56, 57; 180/170, 171, 65.1; 307/10.1, 10.7

[56] References Cited

U.S. PATENT DOCUMENTS

| | | | |
|---|---|---|---|
| 3,686,549 | 8/1972 | Winebrenner | 318/139 |
| 3,989,990 | 11/1976 | Thompson | 318/139 |
| 4,082,988 | 4/1978 | Reime et al. | 318/139 |
| 4,363,999 | 12/1982 | Preikschat | 318/53 |
| 4,491,768 | 1/1985 | Slicker | 318/139 |
| 5,182,508 | 1/1993 | Schauder | 318/801 |

*Primary Examiner*—Jonathan Wysocki
*Attorney, Agent, or Firm*—Evenson, McKeown, Edwards & Lenahan P.L.L.C.

[57] ABSTRACT

This invention aims to realize a superior control system for electric automobile, wherein the current can be accurately controlled according to the state of the automobile and yet high driving performance and charging performance can be achieved. When in the drive mode of the automobile, the system detects the current for drive using the current detector, controls the current of the inverter, and drives the induction motor. When in the charge mode, the system detects the current for charge using the current detector, controls the inverter, and charges the battery with the current from an external power supply. The intensity of the current differs by several times when driving and when charging, but the current detection range of the current detector for drive is wider than the current detection range of the current detector for charge. Therefore, the system detects higher current very accurately when driving and detects lower current very accurately when charging. Either when a charge control is required or when a motor drive control is required, the system can perform accurate current control suitable for each current control range requirement, thereby allowing highly efficient charge control with less noise.

10 Claims, 13 Drawing Sheets

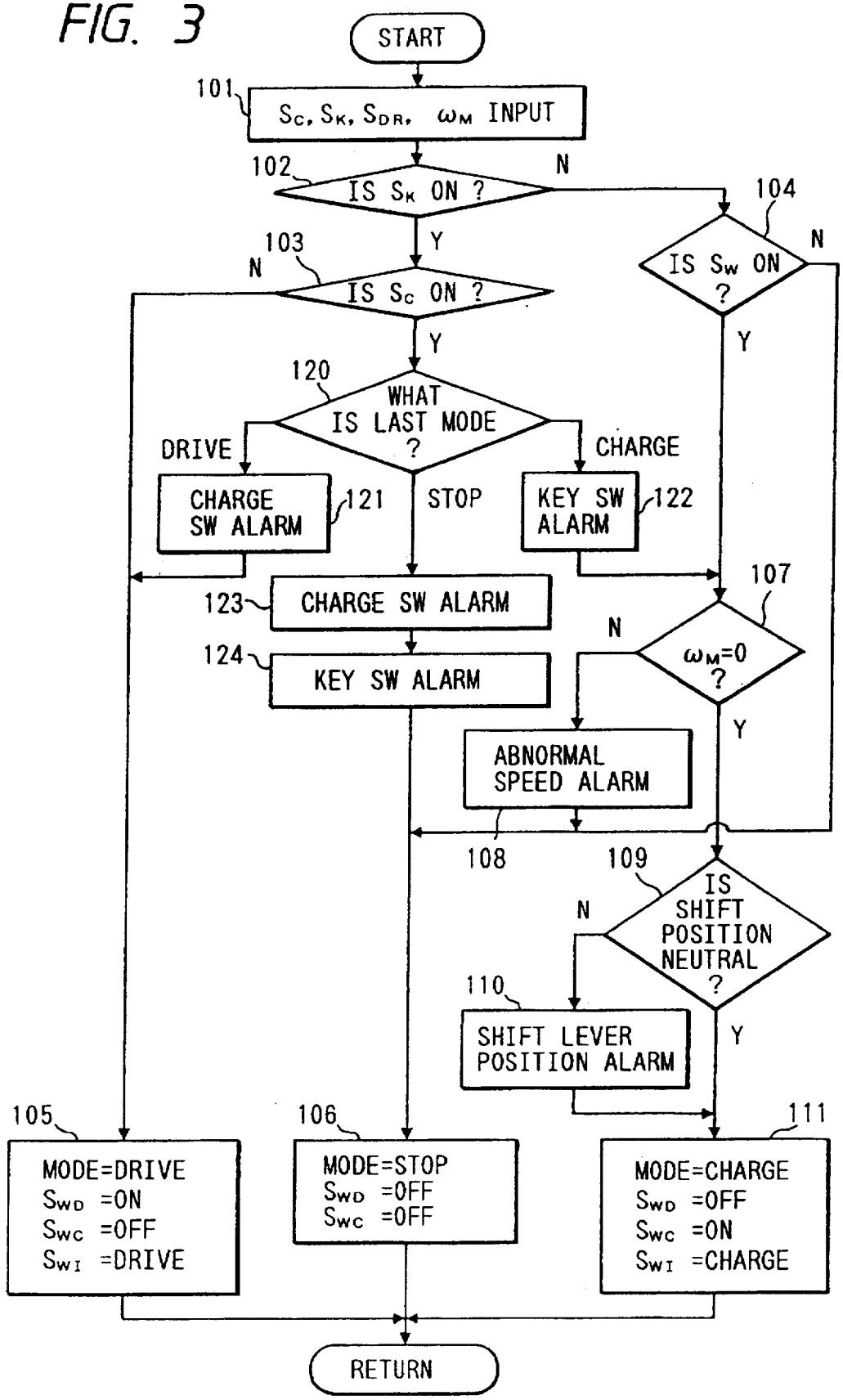

WHEN DRIVING

WHEN CHARGING

WHEN CHARGING (MAGNIFIED N TIMES)

CONTROL SYSTEM AND CONTROL METHOD FOR ELECTRIC AUTOMOBILE

BACKGROUND OF THE INVENTION

1. Field of the Invention

This invention relates to a control system and control method for electric automobile driven by a battery mounted on the vehicle, particularly to such control system and control method for electric automobile that controls the electric energy supplied to the automobile from an external power supply as well as controlling the drive current for the drive motor with the aid of a power converting means.

2. Background Art

Electric automobile is designed so that the electric energy from an external power supply is supplied through a power converter and charged in the battery mounted on the vehicle. The electric automobile is driven by the charged energy. An example of control systems for such electric automobile appears, for example, in Japanese Laid Open Patent No. SHOWA 59-61402. In the example, drive control and battery charge control for the electric automobile are performed by a common inverter, thereby realizing a small and compact electric automobile system at low cost. Another example appears in Laid Open. Patent No. HEISEI 4-138004, in which the control system is designed to be able to charge the battery using the secondary winding of the drive motor.

An example of technique for reducing the loss of drive induction motor for electric automobile appears, for example, in Laid Open Patent No. SHOWA 62-23302, SHOWA 62-236302, SHOWA 62-247703, and SHOWA 62-247785.

In the meantime, when an electric motor is driven in an electric automobile system, current through the power converting means which converts the battery power to the supply power for the motor needs to be detected in order to control the driving force accurately. On the other hand, when the battery is charged by an external power supply, current through the power converting means which converts the power from the external supply to the supply power for the battery needs to be detected in order to control the power and the power factor of the power supply accurately.

In an electric automobile, the current through the power converting means generally varies when charging and when driving, that is, the current which flows through the power converting means when driving is several to more than ten times as high as the current when charging. Because of this, if a common current detecting means is employed both when driving and when charging, it may happen that the current detection accuracy degrades when charging or current cannot be detected due to noise, resulting in that the battery charging action may not be controlled accurately.

However, it was not considered in the abovementioned prior art that the current through the power converting means greatly varies when charging and when driving, and hence a common current detector or detectors having the same detection range were employed.

As a result, it was impossible with the prior art to charge the battery for electric automobile accurately and it was probable to cause overcharge or undercharge.

SUMMARY OF THE INVENTION

Purpose of this invention is to provide a control system and control method which can accurately control the current according to the state of the electric automobile and yet provide superior driving performance and charging performance, for an electric automobile equipped with the power converting means which converts the power from a power storage means to the power for a driving force generating means.

The control system for electric automobile based on this invention is made up of the following to accomplish the above purpose. That is, the control system is made up of a current detecting means, which possesses multiple current detection ranges and detects the current through the power converting means, and a control means, which selects any one of the multiple current detection ranges of the current detecting means according to the control state of the automobile and controls the power converting means according to the output signal from the current detecting means within the selected current detection range.

Preferably, in the said control system for electric automobile, the current detecting means possesses an amplifying means to amplify the current detection signal, and one of the multiple current detection ranges is selected accordingly as the amplification gain of the amplifying means is changed by the control means.

And, preferably, in the said control system for electric automobile, the current detecting means possesses a current transformer.

And, preferably, in the said control system for electric automobile, the current transformer possesses multiple windings of different number of turns and a switching means for selecting one of these windings, and one of the multiple current detection ranges is selected accordingly as the switching means is switched by the control means.

And, preferably, in the said control system for electric automobile, the current transformer possesses the primary winding through which a current from the power converting means flows, multiple secondary windings, and a switching means for selecting one of these secondary windings, and one of the multiple current detection ranges is selected accordingly as the switching means is switched by the control means.

And, preferably, in the said control system for electric automobile, the current transformer possesses the said primary winding through which a current from the power converting means flows, a magnetic substance which generates flux by the current flowing through the primary winding, an output signal generating means which generates a signal corresponding to the flux through the magnetic substance, and the secondary windings which generate flux through the magnetic substance corresponding to the output signal from the output signal generating means so as to neutralize the flux generated by the primary winding, and one of the multiple current detection ranges is selected accordingly as the flux which is generated by the secondary windings corresponding to the output from the output signal generating means is changed by the control means.

Also, the control system for electric automobile in this invention possesses multiple current detecting means each of which has different current detection range and detects the current from the power converting means, and a control means which selects one of the detection signals from the multiple current detecting means and controls the power converting means according to the selected detection signal.

And, preferably, in the said control system for electric automobile, the power converting means converts the power from a power supply prepared outside of the electric automobile and supplies it to the power storage means, and the control means changes the current detection range accordingly as the electric automobile is driven for running or the power storage means is charged, and computes the current necessary for driving and running when driving and the current necessary for charging when charging.

And, preferably, in the said control system for electric automobile, the current detection range when charging is narrower than the current detection range when driving and running.

And, preferably, in the said control system for electric automobile, the current detecting means detects the current between the power converting means, the driving force generating means, and the power supply for charging the said power storage means.

And, preferably, in the said control system for electric automobile, the current detecting means detects the current between the power converting means and the power storage means, and the control means computes the residual capacity of the power storage means.

And, preferably, in the said control system for electric automobile, the control means changes the current detection range corresponding to the variation of the current through the power converting means.

And, preferably, in the said control system for electric automobile, the control means detects whether failure is caused in any of the multiple secondary windings or the multiple current detecting means and, when a failure is detected, it controls the power converting means according to the output signal from the secondary windings or current detecting means which remain normal.

Also, the control system for electric automobile in this invention possesses the current detecting means which includes the first winding to detect the current through the driving force generating means and the second winding, of which the number of turns is different from that of the first winding, to detect the current from the power supply, and the control means which controls the power converting means according to the detection signal from the first winding of the current detecting means when the automobile is driven for driving and controls the power converting means according to the detection signal from the second winding of the current detecting means when the power storage means is charged.

Preferably, in the said control system for electric automobile, the number of turns of the first winding is greater than that of the second winding.

Control method for the said electric automobile is provided in the following. The control means firstly decides whether the electric automobile is currently in the drive mode or in the charge mode.

When it decides that the automobile is in the drive mode, it electrically connects the power converting means and the driving force generating means and controls the driving force in the driving force generating means; and changes the current detection range when the automobile is driven for running and when the power storage means is charged, and detects the driving force control current.

When running, it computes the current necessary for driving and running, and controls the power converting means according to the result of this operation.

When the control means decides that the automobile is in the charge mode, it electrically disconnects the power converting means and the driving force generating means, then electrically connects the external power supply so that the power from it can be supplied to the power storage means via the power converting means, computes the current necessary for charging, and controls the power converting means according to the result of the operation.

Preferably, in the said control method for electric automobile, the current mode of the electric automobile is decided depending upon the key position and the state of the charging connector, for example. When the control means decides that the automobile is in the drive mode, the current detection range for drive control is selected for the output from the current detecting means which detects the current through the power converting means. Then, after inputting the accelerator pedal footing degree and the brake pedal footing degree, the control means computes the output torque reference to be output from the motor, and computes the current reference to be output from each power converting means corresponding to this torque reference. In reply to this current reference, the control means feeds back the output from the current detecting means of which range has been changed to the current detection range for drive control, executes a current control operation, and controls the power converting means according to the result of the operation. Consequently, necessary torque is generated from the driving force generating means.

When the control means decides that the automobile is in the charge mode, it electrically disconnects the power converting means and the driving force generating means and also electrically connects the power supply so that the power from it can be supplied to the power converting means, then it changes the range for the output from the current detecting means to the current detection range for charge control. After that, the control means computes the charge current reference according to the voltage of the external power supply and the residual capacity of the battery, and in reply to the charge current reference it feeds back the output from the current detecting means, of which range has been changed to the current detection range for charge control, and executes a current control operation. The power converting means is controlled in this way, and hence the electric energy to be charged in the power storage means is controlled accurately. Thus, it becomes possible to realize such control system or control technique for electric automobile that can control the current always accurately regardless of when driving or when charging and yet provide superior driving performance and charging performance.

Also, when the control means decides that a failure is caused in one of the current detecting means, it switches the output from the failed current detecting means to that from another normal one and maintains the control. This prevents a condition where driving and charging are disabled and realizes highly reliable control system or control method for electric automobile.

BRIEF DESCRIPTION OF THE INVENTION

Other objects, advantages and novel features of the present invention will become apparent from the following detailed description of the invention when considered in conjunction with the accompanying drawings.

FIG. 3 is a flowchart for the mode decision section shown in FIG. 2.

Figure 4A:
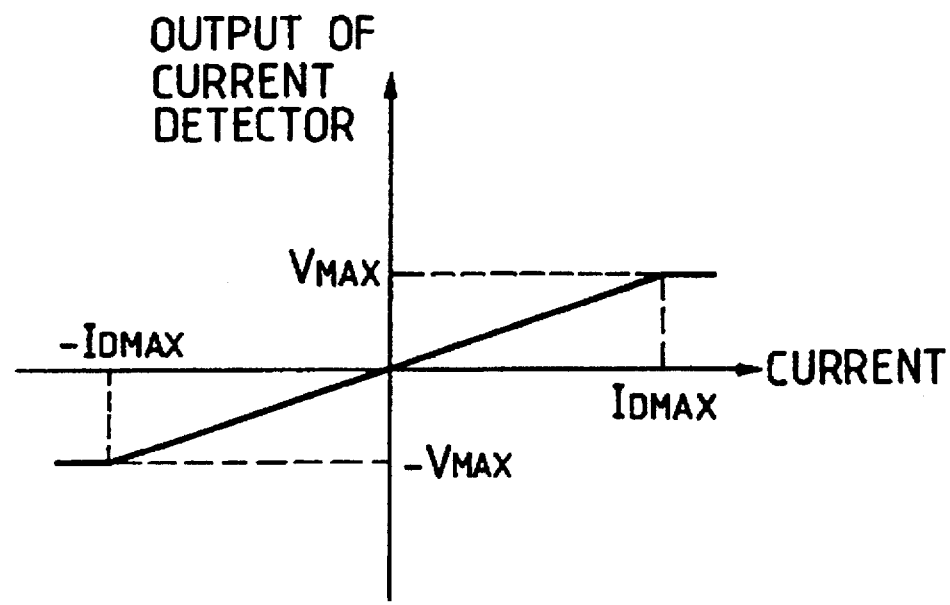

FIGS. 4(a) and (b) current detection characteristic curves of two current detectors.

Figure 1:
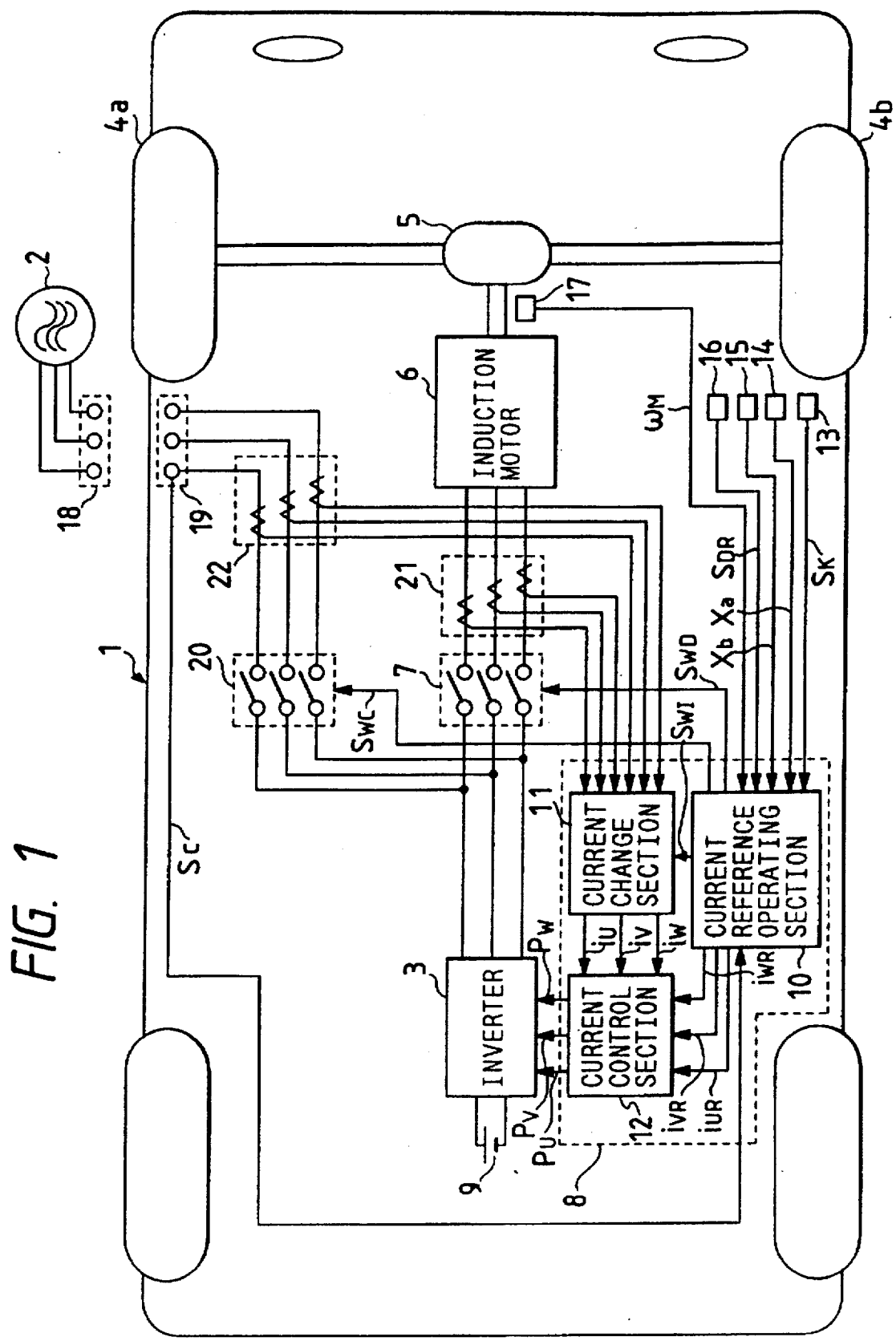
FIG. 1 is an overall schematic and block diagram presentation of a control system for electric automobile, which is an embodiment of this invention.
Figure 5A:
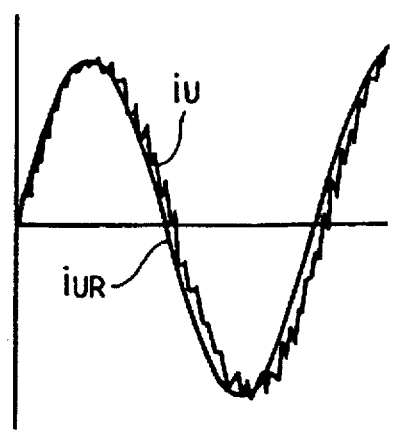
Figure 5B:
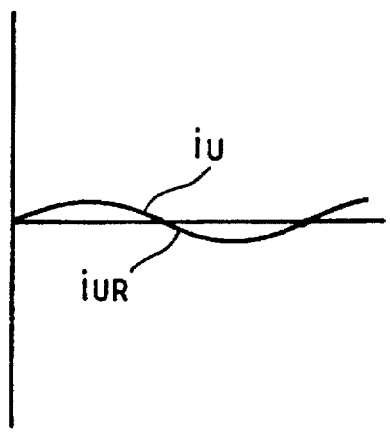
Figure 5C:
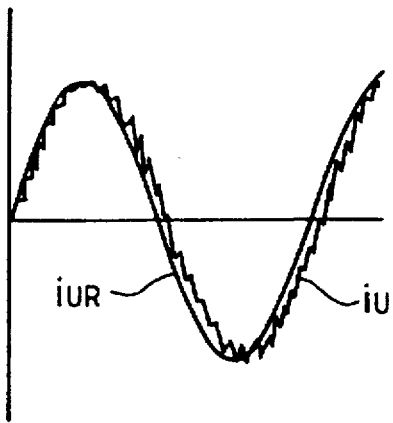

FIGS. 5(a)–c show current detection waveforms which exhibit different current intensity in the current control when driving and when charging in the embodiment shown in FIG. 1.

Figure 6:
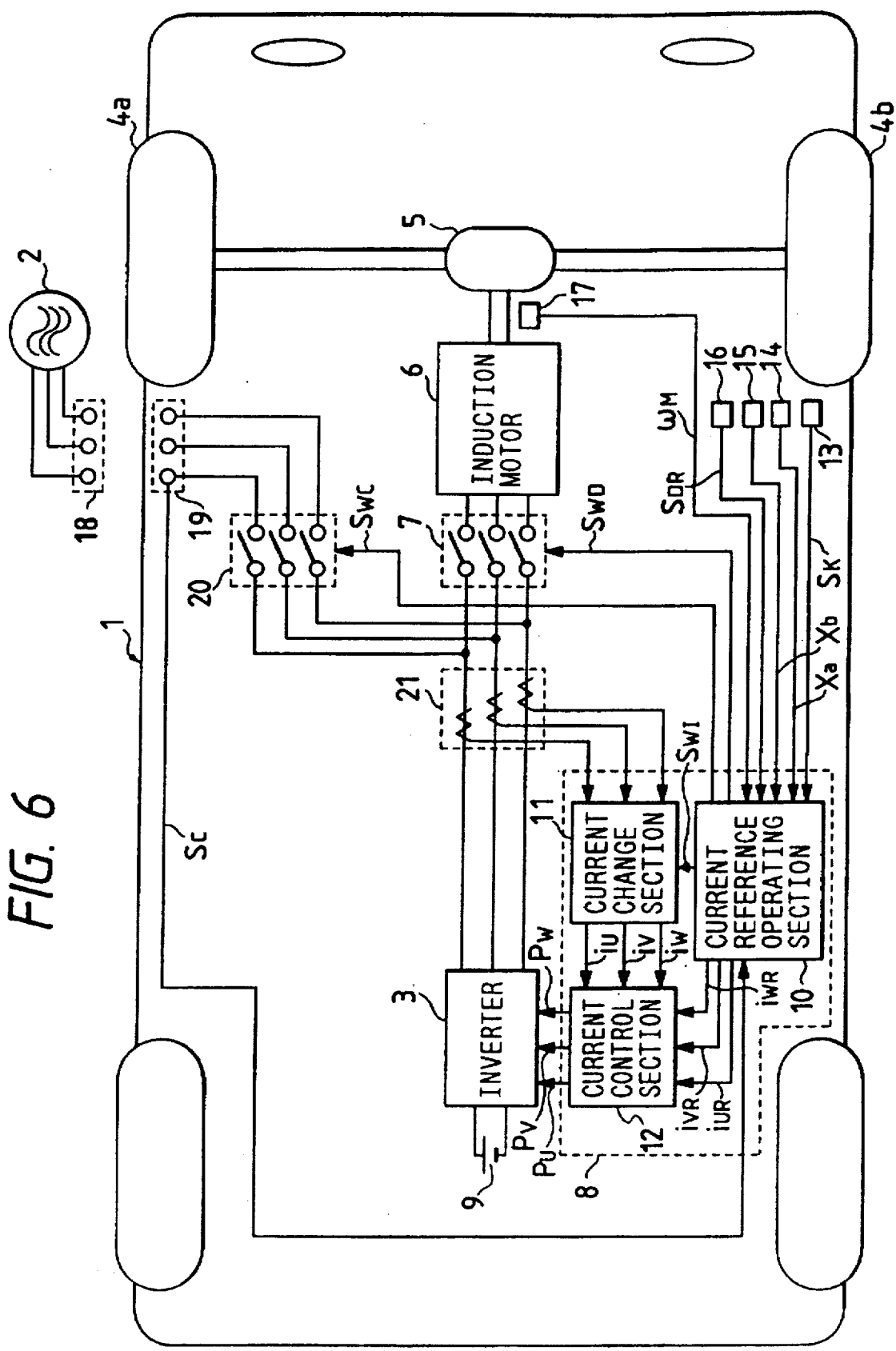

FIG. 6 is a schematic and block diagram presentation of this invention in another embodiment.

Figure 7:
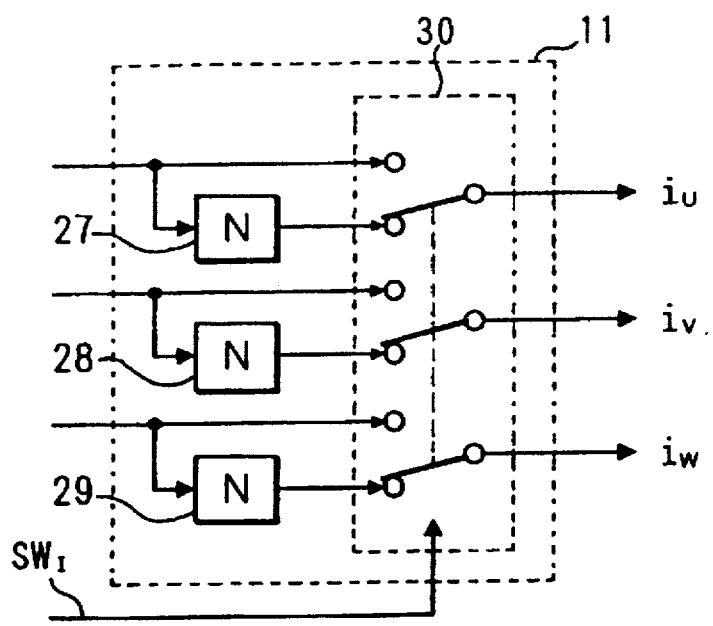

FIG. 7 is a block diagram presentation of the current control change section in the embodiment shown in FIG. 6.

Figure 8:
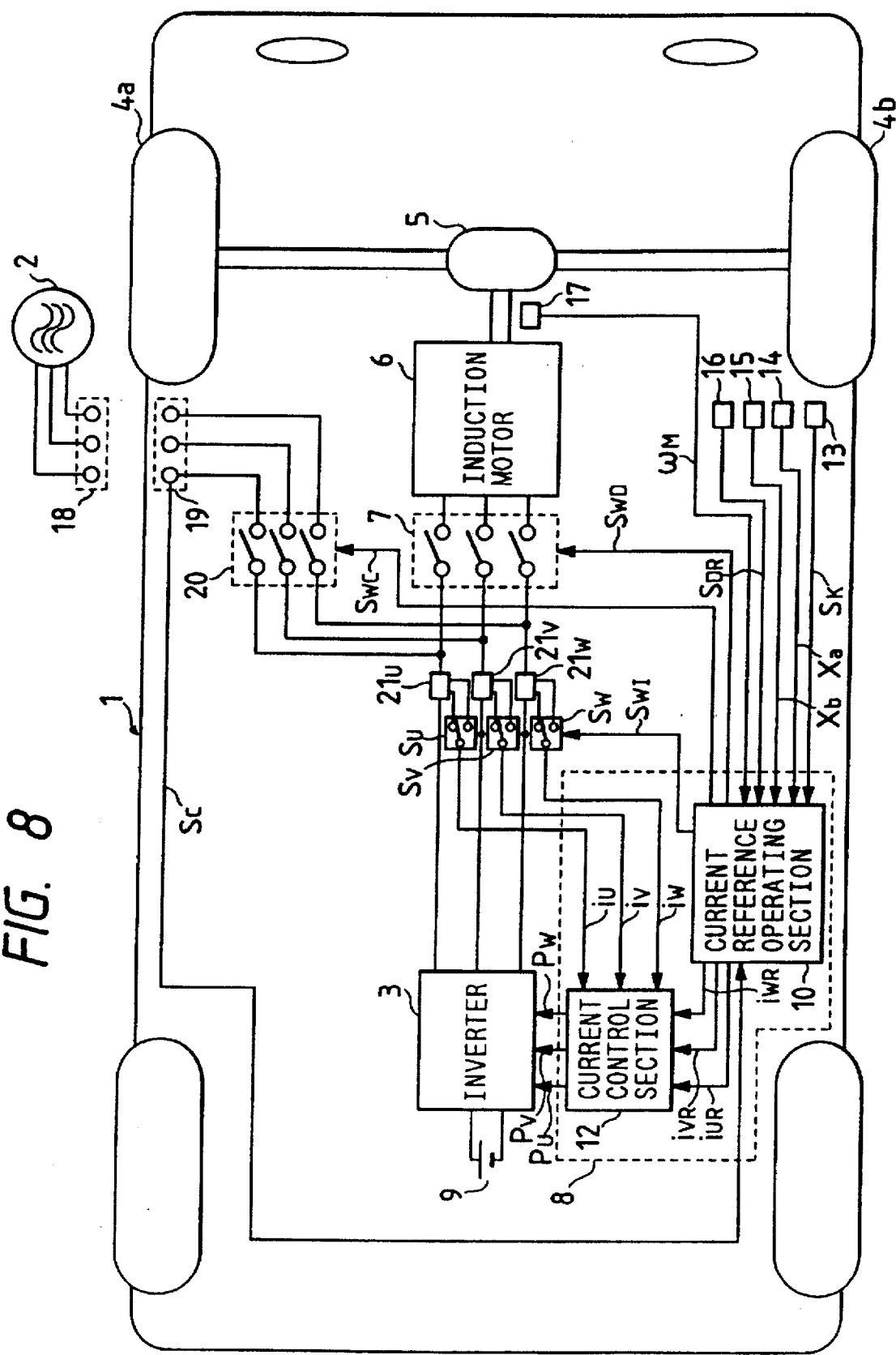

FIG. 8 is a schematic and block diagram presentation of this invention in another embodiment.

Figure 9:
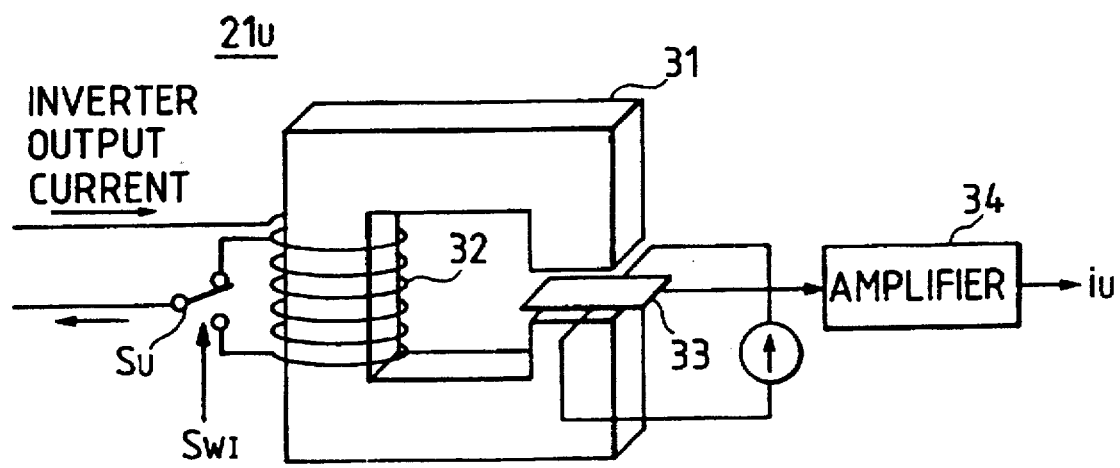

FIG. 9 is a schematic diagram presentation of the current detector in the embodiment shown in FIG. 8.

Figure 10:
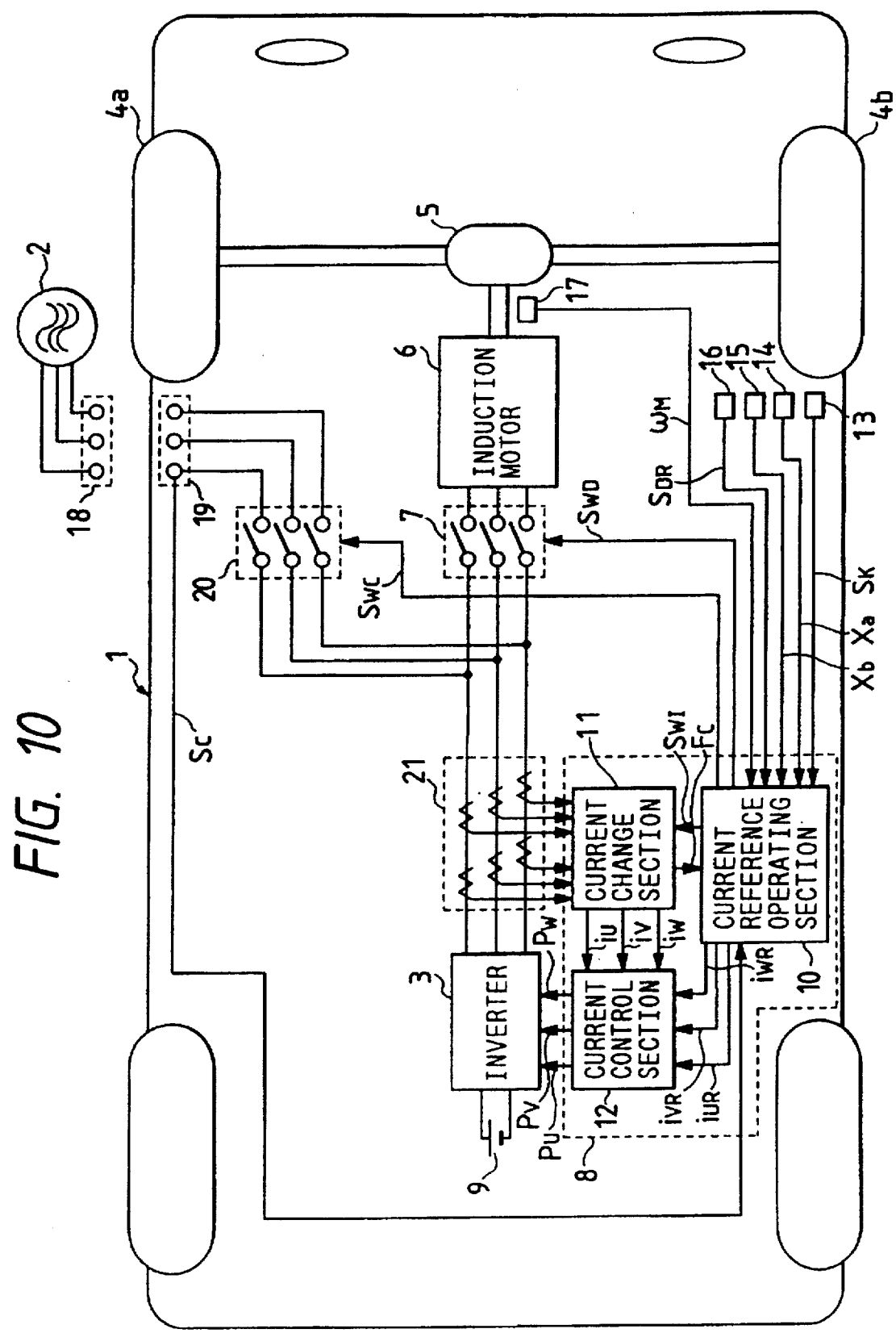

FIG. 10 is a schematic and block diagram presentation of this invention in another embodiment.

Figure 11:
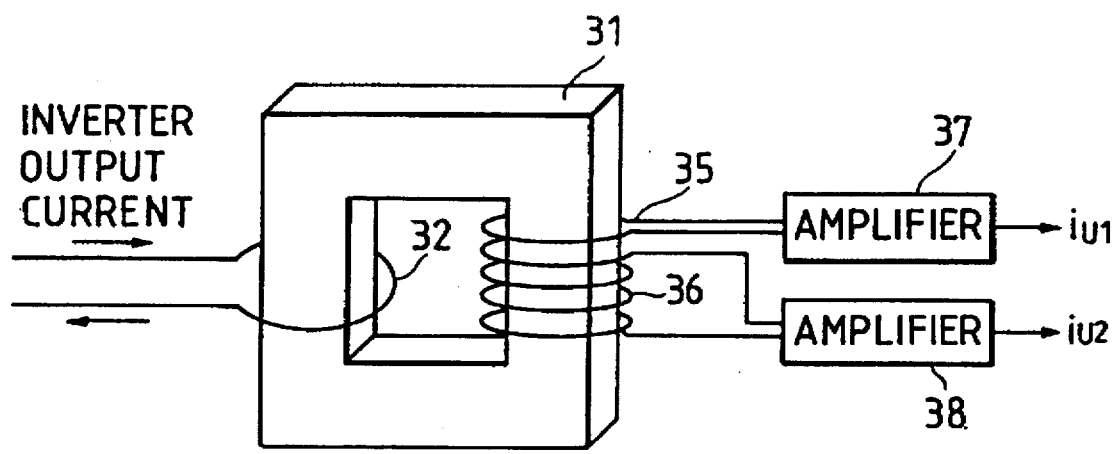

FIG. 11 is a schematic diagram presentation of the current detector in the embodiment shown in FIG. 10.

Figure 12:
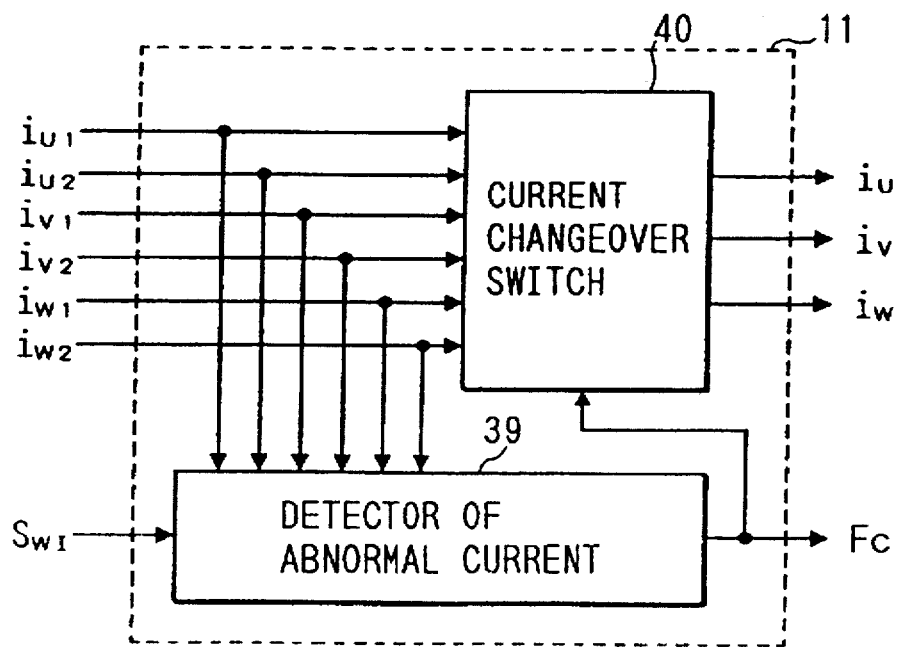

FIG. 12 is a block diagram presentation of the current change section having a detector of abnormal current in the embodiment shown in FIG. 10.

Figure 13:
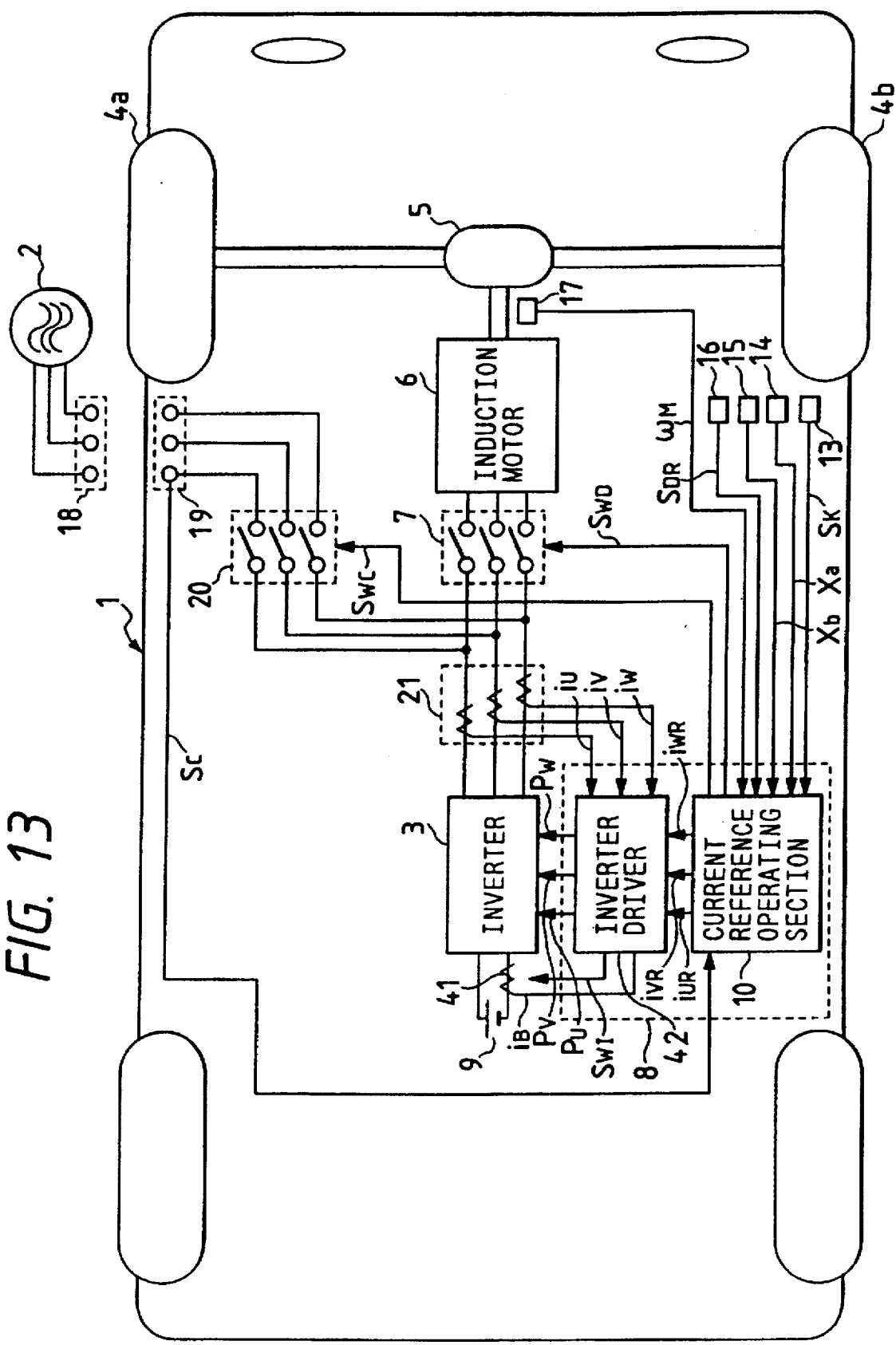

FIG. 13 is a schematic and block diagram presentation of this invention in another embodiment.

Figure 14:
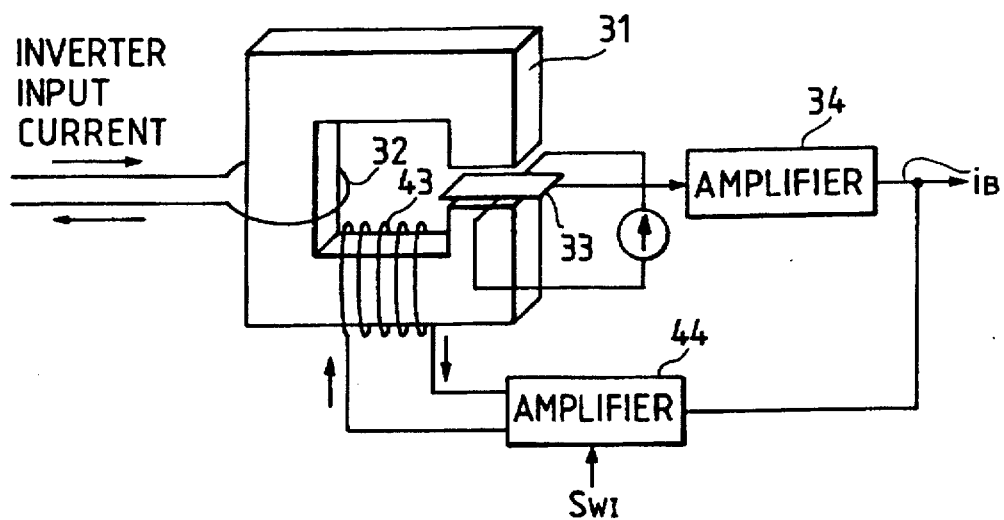

FIG. 14 is a schematic diagram presentation of the current detector that always controls the secondary winding so as to neutralize the flux.

Figure 15:
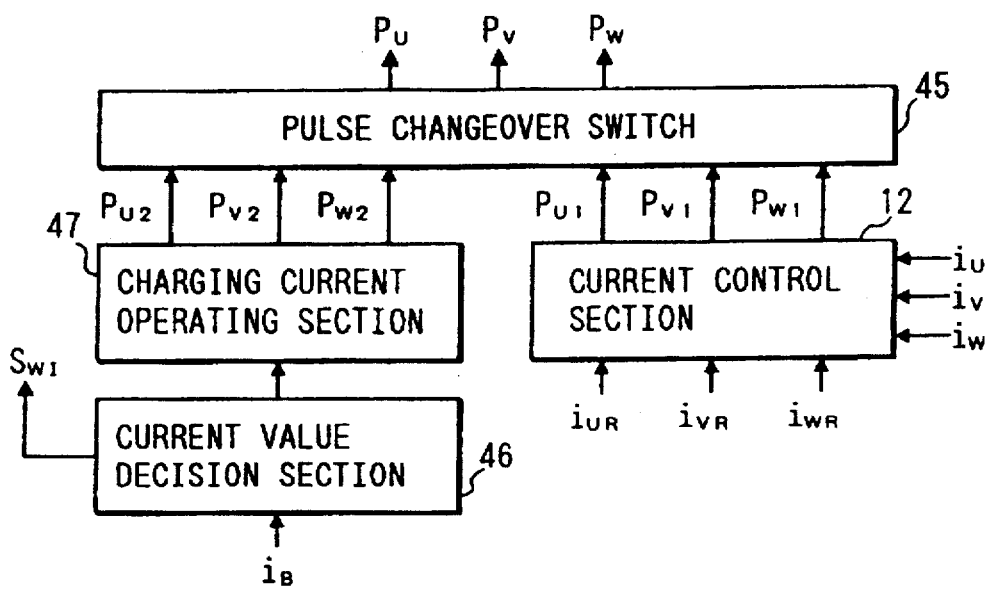

FIG. 15 is a block diagram presentation of the inverter driver in the embodiment shown in FIG. 13.

Figure 16:
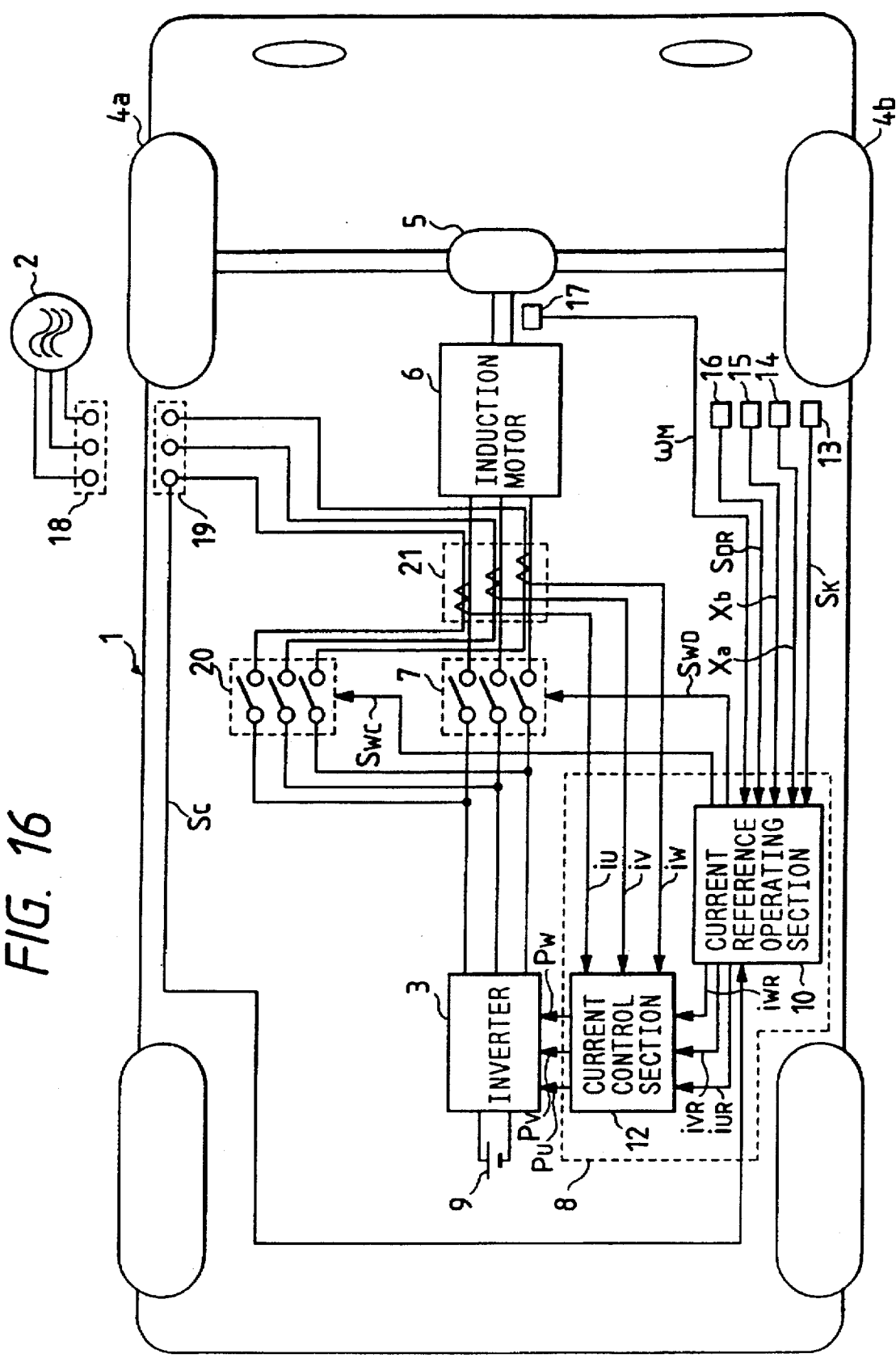

FIG. 16 is a schematic and block diagram presentation of this invention in another embodiment.

Figure 17:
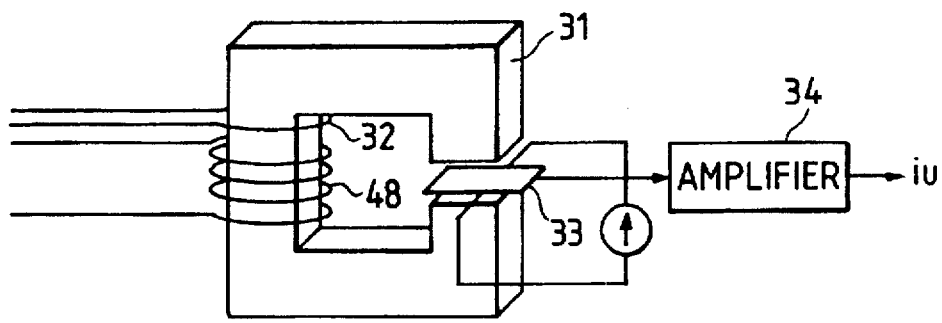

FIG. 17 is a schematic diagram presentation of the current detector in the embodiment shown in FIG. 16.

DETAILED DESCRIPTION

Embodiments of this invention are described hereafter according to the figures attached.

FIG. 1 is a schematic and block diagram presentation of a current control system for electric automobile in an embodiment of this invention. In FIG. 1, the front wheels 4a and 4b of the electric automobile 1 are mechanically connected with the induction motor 6 by way of the differential mechanism 5. In the drive control mode of the induction motor 6, the induction motor 6 is electrically connected with the inverter 3 by way of the connection switch for drive 7. The inverter 3, which is controlled by the pulse width modulation (PWM) signals $P_U$, $P_V$ and $P_W$ being output from the current control section 12 of the controller 8, converts the power from the battery 9 to the motor 6.

The controller 8 consists of the current reference operating section 10, current change section 11, and current control section 12. The current reference operating section 10 receives input from the key switch 13, accelerator pedal 14, and brake pedal 15, which are all operated by the driver, in the form of a key signal Sk, accelerator pedal footing degree signal xa, and brake pedal footing degree signal xb, respectively. The shift signal SDR, motor speed signal ωM, and charge connection signal SC are also input to the current reference operating section 10. The shift signal SDR is a signal from the shift lever 16, indicating an instruction of the driver to the electric automobile 1 such as moving forward, moving backward, or parking. The motor speed signal ωM is a detection signal from the motor speed detector 17, and the charge connection signal SC is a signal which is output from the charging terminal 19 when the connector terminal 18 of the external power supply 2 is connected to the charging terminal 19 of the electric automobile 1.

The current reference operating section 10 (of which detailed description will be given later) decides whether the automobile is in the drive mode or in the charge mode by computing the input signals, and outputs change signals SWD, SWC, and SWI to the connection switch for drive 7, connection switch for charge 20, and current change section 11, respectively. When in the drive mode, the current reference operating section 10 outputs a change signal SWD so that the connection switch for drive 7 is connected and the connection switch for charge 20 is disconnected. When in the charge mode, it outputs change signals SWD and SWC so that the connection switch for drive 7 is disconnected and the connection switch for charge 20 is connected.

The current detector for drive 21 is installed on the connection line between the connection switch for drive 7 and the induction motor 6, while the current detector for charge 22 is installed on the connection line between the connection switch for charge 20 and the charging terminal 19. When in the drive mode, the current change section 11, in response to the change signal SWI, outputs the output signals of each phase U, V and W from the current detector for drive 21 to the current control section 12 in the form of respective current detection signals $i_U$, $i_V$ and $i_W$. When in the charge mode, the current change section 11 selects the output signals from the current detector for charge 22 in response to the change signal SWI, and outputs them in the form of respective current detection signals $i_U$, $i_V$ and $i_W$.

Also, the current reference operating section 10 computes the current reference signals $I_{UR}$, $i_{VR}$ and $i_{WR}$ of each phase and outputs them to the current control section 12 to control the current of each phase through the inverter 3. The current control section 12 compares the current reference signals of each phase $i_{UR}$, $i_{VR}$ and $i_{WR}$ with the current detection signals of each phase $i_U$, $i_V$ and $i_W$ output from the current change section 11, respectively, and computes the PWM pulse signals $P_U$, $P_V$ and $P_W$ to be output to the inverter 3.

Figure 2:
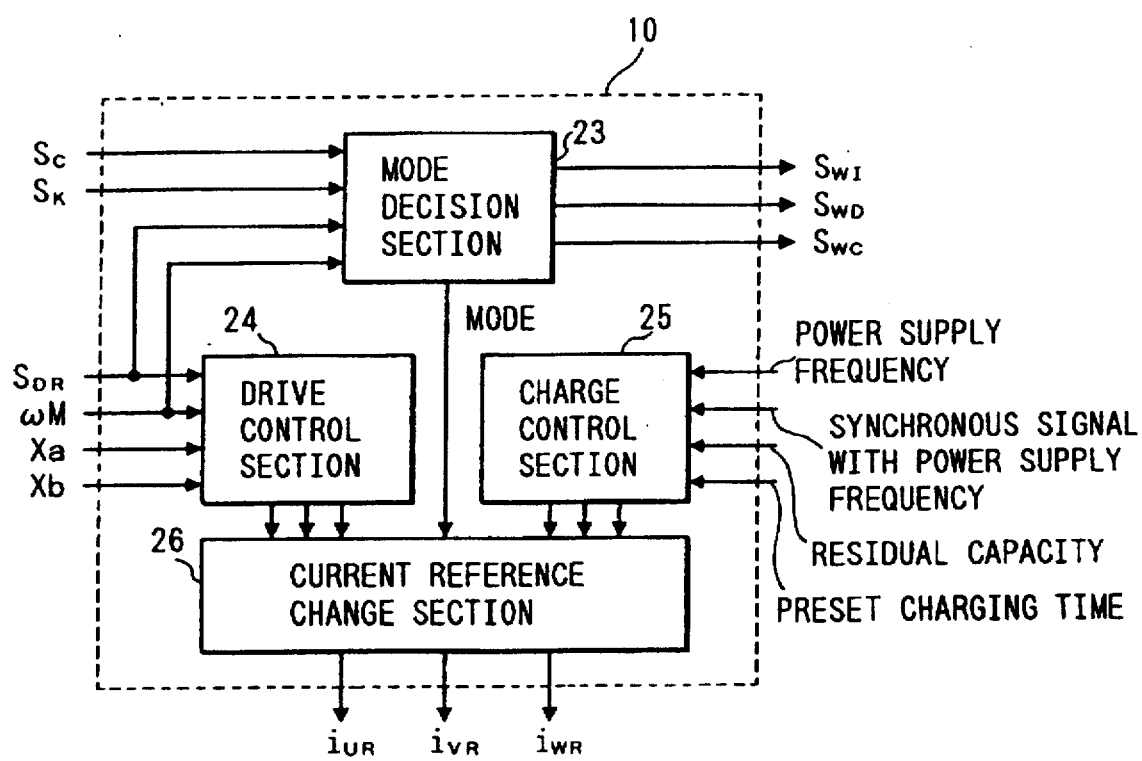
FIG. 2 is a schematic and block diagram presentation of the current reference operating section in the embodiment shown in FIG. 1.

Detailed description about the process in the current reference operating section 10 is provided hereunder. As shown in FIG. 2, the current reference operating section 10 consists of the mode decision section 23, drive control section 24, charge control section 25, and current reference change section 26. The mode decision section 23 executes a process flow as shown in the flowchart in FIG. 3.

After the key signal Sk, charge connection signal SC, shift signal SDR, and motor speed signal M are input at step 101 in FIG. 3, the mode decision section 23 decides whether the key switch 13 is ON or OFF according to the key signal Sk. The process of the system goes to step 103 when the key switch 13 is ON and to step 104 when the key switch 13 is OFF. In either case, the system checks the state of the charging switch according to the charge connection signal SC.

When the charge connection signal SC is decided to be OFF at step 103, the system sets the change signal SWD to ON, change signal SWC to OFF, and change signal SWI to selecting the current detector for drive 21 at step 105 after setting the mode to the drive mode. In consequence, the switch 7 is set to ON and the switch 20 is set to OFF. When the charge connection signal SC is OFF at step 104, the process flow jumps to step 106, wherein the system sets the change signals SWD and SWC to OFF after setting the mode to the stop mode. When the charge connection signal SC is ON at step 104, the process goes to step 107, wherein the system checks whether the motor speed signal ωM is 0. If the signal ωM is not 0, the process goes to step 108, wherein the system displays an abnormal speed alarm, then goes to step 106 and changes to the stop mode. Since this process flow means that the battery 9 is charged while the motor 6 is in operation, a process to stop charging is employed in actual system to secure the safety. When the motor speed signal $W_M$ is 0 at step 107, the system checks the shift position of the shift lever 16 according to the shift signal SDR at step 109. Since the motor 6 is not driven when charging, the above process is not affected by the position of the shift lever 16. In consideration of the safety after completion of charging, however, a shift lever position alarm is output at step 110 if the shift lever 16 is positioned anywhere except at the neutral, and the process goes to step 111. Needless to say, it goes directly to step 111 when the shift lever 16 is positioned at the neutral. At step 111, the system sets the mode to the charge mode, and then sets the change signal SWD to OFF, change signal SWC to ON, and change signal SWI to selecting the current detector for charge 22. In consequence, the switch 7 is set to OFF and the switch 20 is set to ON.

When both the key switch 13 and the charging switch are ON, the process goes to step 120 through the decision making process at step 102 and step 103. Generally speaking, both the key switch 13 and the charging switch should not be set to ON together. If both are ON together, however, the following process is performed in consideration of the last mode. If the last mode is the drive mode at step 120, the process flow of the system goes to step 121 so as to continue driving, wherein the system issues a charging switch alarm, and then it processes step 105. If the last mode is the charge mode at step 120, the process goes to step 122, wherein the system issues an alarm to the key switch 13, and then processes step 107 and thereafter. If the last mode is the stop mode at step 120, the process goes to step 123 and to step 124, wherein the system issues an alarm on the key switch 13 and the charging switch, respectively, and then it processes step 106. The above describes the process in the mode decision section 23.

The drive control section 24 shown in FIG. 2 receives inputs of the shift signal SDR, accelerator pedal footing degree xa, and brake pedal footing degree xb, and computes torque reference necessary for a vehicle. Then, using the computed torque reference and the motor speed signal ωM, it computes the current reference signals $i_{UR}$, $i_W$ and $i_{WR}$ of each phase of the inverter 3 when driving. The charge control section 25 computes the current reference signals $i_{UR}$, $i_{VR}$ and $i_{WR}$ of each phase when charging, using the power supply frequency signal, synchronous signal with power supply, rest capacity signal of the battery 9, and preset charging time signal. Voltage of the current reference signals $i_{UR}$, $i_{VR}$ and $i_{WR}$ when charging are set N times as high as that of the current reference signals when driving provided the same current reference is to be indicated. The power supply frequency signal, synchronous signal with power supply, and residual capacity signal are computed by an operating means (not shown) using the current detection signals from the current detectors 21 and 22, and the computed signals are supplied to the charge control section 25. The preset charging time is preset by the driver, using the charge setting section (not shown), and a signal indicating the preset charging time is supplied to the charge control section 25. In the above process, it is permissible to design the system so that the current detection signals from the current detectors 21 and 22 are supplied directly to the charge control section 25 and the power supply frequency, synchronous signal with power supply, and residual capacity are computed in the charge control section 25.

The current reference change section 26 changes the current reference signal according to the mode specified. That is, according to the mode signal from the mode decision section 23, the current section reference change 26 outputs the current reference signal received from the drive control section 24 when in the drive mode, and outputs the current reference signal received from the charge control section 25 when in the charge mode.

Figure 4B:
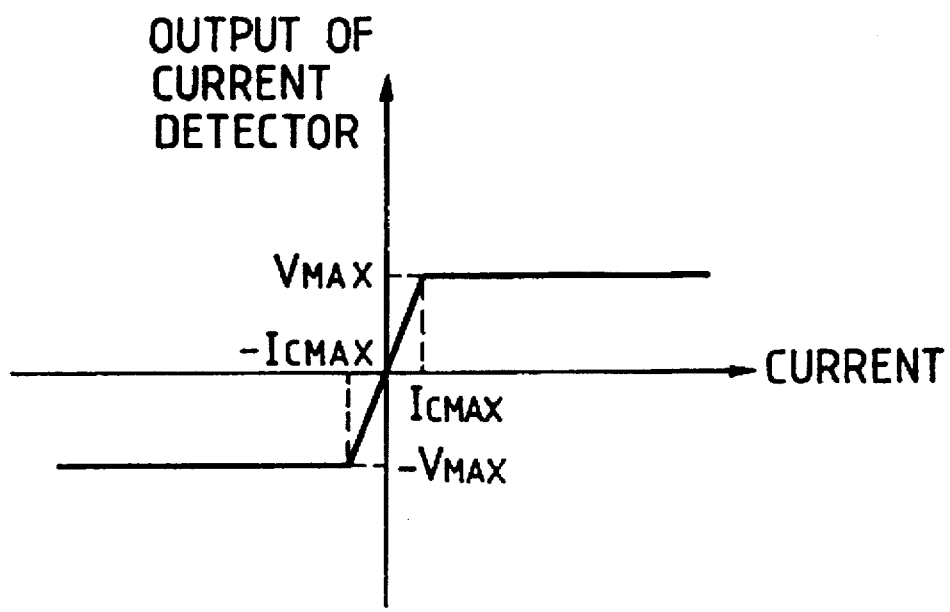

The current detector for drive 21 and the current detector for charge 20, both of which are important element of this invention, are described hereunder with the reference of FIG. 4.

FIG. 4 (a) presents the characteristic of the current detector for drive 21, exhibiting that the output voltage of the current detector for drive 21 reaches V MAX when the output current of the inverter 3 is I DMAX. On the other hand, the current detector for charge 22 shown in FIG. 4 (b) is set so that the output voltage reaches V MAX when the output current of the inverter 3 is I CMAX. The current values I CMAX and I DMAX are the maximum current that flows when charging and when driving, respectively, and the current value I CMAX is generally set to one over several tens of the current value I DMAX. That is, the gain of the current detector for charge 22 is several tens of times as high as the gain of the current detector for drive 21 in FIG. 4. This ratio is set to N times. This ratio is the same as the magnification of the abovementioned current references.

FIG. 5 shows different current intensity in the current control when driving and when charging. FIG. 5 (a) shows the current reference signal $i_{UR}$ and the current detection signal $i_U$ when driving, while FIG. 5 (b) shows the current reference signal $i_{UR}$ and the current detection signal $i_U$ when charging. Comparing the current control when charging as shown in FIG. 5 (a) and the control when driving as shown in FIG. 5 (b), it is understood that the system is supposed to control very low current of one over several tens of times as small as the current when driving for a long time. Because of this, if the current control when charging is performed in the same dynamic range as is used when driving, the current waveform may be deformed or useless current may be applied by an effect of the harmonic noise generated by the inverter 3. In particular, since the current is frequently taken from the commercial power source when charging, the abovementioned current control may cause a problem because a current with deformed waveform flows back into the commercial power source.

In this embodiment, therefore, the current is switched when charging as shown in FIG. 5 (c) so that both the current reference signal $i_{UR}$ and the current detection signal $i_U$ are magnified N times for control. This enables to increase the S/N ratio also when charging, resulting in reduced effect by the noise. In other words, using this embodiment makes it possible to control the current accurately and charge the battery 9 properly even when charging. In addition, charge control with higher efficiency can be realized because there is no useless current flow caused by the noise and a sinusoidal current having lower distortion can be applied. In short, accurate current control is available according to the state of the electric automobile, i.e. when charging or when driving, thereby realizing a control system for electric automobile with both high driving performance and high charging performance.

FIG. 6 is a schematic and block diagram of this invention in another embodiment, which differs from the embodiment in FIG. 1 in a point that a common current detector is used when charging and when driving. As compared to the embodiment in FIG. 1, configuration of the one in FIG. 6 is that the current detector 21 is installed on the connection line between the inverter 3 and the switches 7 and 20, and that the current is detected by this current detector 21 in both modes of when charging and when driving. The current detection range of the current detector 21 is changed by the current change section 11.

FIG. 7 is a block diagram of the current change section 11. The current change section 11 includes the amplifiers 27, 28 and 29 which amplify the current detection signals of each phase received from the current detector 21 to N times, and the current change switch 30. When the change signal SWI from the current reference operating section 10 indicates a signal for drive, the current change switch 30 outputs the current detection signals of each phase received from the current detector 21 directly as they are without letting them through the amplifiers 27, 28 and 29. When the change signal SWI indicates one for charge, the current change switch 30 is switched to the side of the amplifiers 27, 28 and 29, and accordingly the amplified signals are output. Consequently, accurate current control is made available both when driving and when charging. In other words, in the embodiment shown in FIG. 6, charge control at lower cost but with lower distortion is made available in addition to the effect achieved in FIG. 1, because a common current detector can be used when charging and when driving.

FIG. 8 is a schematic and block diagram of this invention in another embodiment. It differs from the one in FIG. 6 in that the current detection range is changed inside of the current detector 21. That is, the detectors for each phase of the current detector 21, i.e. 21u, 21v and 21w are equipped with the switches Su, Sv and Sw. The change signal SWI from the current reference operating section 10 is input to the switches Su, Sv and Sw, and the current detection range is changed inside of the switches.

FIG. 9 is a schematic diagram of the detector 21u for one phase of the current detector 21. The detector 21u in FIG. 9 consists of the magnetic path 31, primary winding 32, Hall element 33, and amplifier 34. The primary winding 32 is wound on the magnetic path by kN turns, and one terminal of the switch Su is connected to the primary winding 32 at a position where the number of turns is k (k is an integer, and k=1 for an example in FIG. 9). The other terminal of the switch Su is connected to the primary winding 32 at another position where the number of turns is kN. Since the output current or input current of the inverter 3 is to be applied to the primary winding 32, the switch Su is set to the side of one terminal when the change signal SWI is for charge. And the switch SU is set to the side of another terminal when the change signal SWI is for drive.

The flux passing through the magnetic path 31 is detected by the Hall element 33, and the detected signal is supplied to the amplifier 34. Then, the current detection signal $i_V$ is output from the amplifier 34. Description about the detectors 21v and 21w is omitted because they have the same configuration as the detector 21u.

From the embodiment in this FIG. 8, the same effect can be gained as in FIG. 6. Moreover, since the configuration of the embodiment in FIG. 8 is that the current detection range is changed by switching the number of turns of the primary winding 32 accordingly as when charging or when driving, more accurate and yet highly efficient current control is made available because the configuration allows that the noise from the current detectors are not amplified N times by the amplifier.

FIG. 10 is a schematic and block diagram of this invention in another embodiment, which exhibits an example wherein higher reliability can be achieved against a failure in the current detector 21. The embodiment in FIG. 10 is an example of using the current detector 21 commonly when charging and when driving, the same as in FIG. 6 and FIG. 8. FIG. 11 shows a detail of a detector for one phase of the current detector 21 for the embodiment shown in FIG. 10. In FIG. 11, the detector is designed to have one primary winding 32 and two secondary windings 35 and 36. In response to the primary current, the secondary windings 35 and 36 output the corresponding current detection signals $i_{U1}$ and $i_{U2}$ through the amplifiers 37 and 38, respectively. The number of turns of the secondary winding 36 is N times as great as that of the secondary winding 35. The current detection signals $i_{U1}$ and $i_{U2}$ are for drive and for charge, respectively, and $i_{U1}$ $i_{U2}$ applies in terms of the same output current of the inverter 3.

These current detection signals $i_{U1}$ and $i_{U2}$ are input to the current change section 11 shown in FIG. 12. In a normal operation, which of the two current detection signals should be output when charging and which should be output when driving are selected by the current changeover switch 40 according to the change signal SWI. The current detection signal from the current detector 21 is supplied to the detector of abnormal current 39. Then, the detector of abnormal current 39 checks for failure in the current detector 21 judging from the intensity of the supplied current detection signal. When no failure is detected, it controls the current changeover switch 40 according to the change signal SWI from the current reference operating section 10. In this case, the detector of abnormal current 39 informs the current reference operating section 10 of occurrence of no failure in the current detector 21 by means of the current detection failure signal FC. If any failure is detected in one current detection signal from the current output, it changes over connection entirely to the other normal current detection signal irrespective of the instruction of the change signal SWI. For example, when any one of the current detection signals $i_{u1}$, $i_{v1}$ and $i_{w1}$ for drive is decided to be abnormal, the detector changes over connection to the current detection signals $i_{u2}$, $i_{v2}$ and $i_{w2}$ for charge even when driving. Then, it informs the current reference operating section 10 of the failure of the detected current for drive by means of the current detection failure signal FC.

The current reference operating section 10 limits the current reference but continues the drive control so as to enable the system to control the current within a detectable current detection range of the normal current detector 21. Similarly when charging, if any one of the current detection signals for charge is failed, the charge control is maintained by using the current detection signals for drive in place of them.

Accordingly, the same effect as in FIG. 6 can be expected from the embodiment shown in FIG. 10. Moreover, in the embodiment shown in FIG. 10, even if one of the current detectors is failed, the system can continue to control the current without terminating the driving or charging operation, making it possible not only to enhance the performance but to realize a control system for electric automobile with much more enhanced reliability.

FIG. 13 is a schematic and block diagram of this invention in another embodiment, wherein the current detector 21 is installed on the connection line between the inverter 3 and the switches 7 and 20 in the same arrangement as in the embodiments shown in FIGS. 6, 8 and 10. This current detector 21, however, is for drive control of the motor, and the current detector 41 which is installed on the connection line between the inverter 3 and the battery 9 is employed for detecting the current for charge control. When the motor is driven, the current detector 41 is normally used to monitor the energy consumption of the battery. At that time, it is necessary to set the current detection range wider because a current as high as several hundreds of amperes is applied. When charging, the system performs charge control according to the current value detected by the current detector 41. All the above processes are completed by the inverter driver 42.

FIG. 14 is a schematic diagram of the current detector 41. In FIG. 14, the current detector 41 consists of the primary winding 32 through which the input current from the inverter 3 flows, Hall element 33 which outputs a signal by the flux generated through the magnetic path 31, amplifier 34 which amplifies and outputs the output signal $i_B$ of the Hall element 33, amplifier 44 of which amplification factor varies corresponding to the change signal SWI, and secondary winding 43 which lets the current flow along the direction so as to neutralize the flux generated by the primary winding 32. The output signal $i_B$ from the amplifier 34 is amplified by the amplifier 34 and flows into the secondary winding 43.

The output signal $i_B$ from the amplifier 34 becomes stronger as the input current to the inverter 3 becomes higher, but the configuration of the system is that the flux generated by the secondary winding 43 also becomes stronger in proportion to the signal and consequently the flux generated through the magnetic path 31 is small and hence magnetic saturation is hard to occur with the magnetic path 31. Therefore, the size of the current detector 41 can be smaller in terms of its detectable current value. Changing the amplification gain of the amplifier 44 makes it possible to easily change the current detection range of the current detector 41 without degrading the accuracy. Owing to this, it is possible to narrow the current detection range to several tens of amperes according to the change signal SWI and enhance the absolute accuracy in case that the current is low such as when charging.

FIG. 15 is a schematic and block diagram of the inverter driver 42. In FIG. 15, when driving, the current control section 12 outputs the PWM pulse signals $P_{U1}$, $P_{V1}$ and $P_{W1}$ to the pulse change section 45 according to the current detection signals $i_u$, $i_v$ and $i_w$ and the current reference signals $I_{UR}$, $i_{VR}$ and $i_{WR}$, similarly as in the embodiment shown in FIG. 1. Those signals are then output from the pulse change section 45 to the inverter 3 as the pulse signals $P_U$, $P_V$ and $P_W$. When driving, as aforementioned, the current detection signal $i_B$ from the current detector 41 is normally used to monitor the energy consumption of the battery. That is, when driving, the current detection signal from the current detector 41 is supplied to the battery consumption computing section (not shown) and the section computes the degree of consumption of the battery 9.

When charging, on the other hand, the current detection signal $i_B$ detected by the current detector 41 is supplied to the current value decision section 46. The current value decision section 46 computes the optimum amplification factor of the amplifier 44 from the current detection signal $i_B$, and outputs a signal SWI containing the computed amplification gain to the amplifier 44. The current value decision section 46 outputs an operation command signal to the charge current operating section according to the current detection signal $i_B$. Under a charge control, the PWM pulse signals are output through the pulse change section 45 so that the inverter 3 are driven according to the PWM pulses computed in this section.

The abovementioned specific embodiment shown in FIG. 13 provides the same effect as is achieved in FIG. 1. Moreover, in the embodiment shown in FIG. 13, it is possible when driving to monitor the consumption of the battery 9 by means of the current detector 41. And when charging, because an optimum current detection range is specified according to the charging current and current control is performed within the range, it is possible to control the current much more accurately. That is, for example, very accurate charge control is made available for different types of the external power supply 2 having different current levels.

FIG. 16 is a schematic and block diagram of this invention in another embodiment. The embodiment in FIG. 16 is a specific example wherein the current detector 21 is installed on the connection line between the switches 7 and 20, induction motor 6 and charging terminal 19. The embodiment in FIG. 16 also represents an example wherein the change signal SWI is not necessary and accordingly the current changeover section 11 is omitted. That is, the current detection signals $i_U$, $i_V$ and $i_W$ from the current detector 21 are supplied directly to the current control section 12.

FIG. 17 is a schematic diagram of a detector for one phase of the current detector 21.

In FIG. 17, the current detection principle of the current detector 21 is nearly equal to that for the embodiment shown in FIG. 9. That is, voltage is generated by the Hall element 33 corresponding to the flux generated through the magnetic path 31 and the voltage is amplified by the amplifier 34. In the current detector 21, the primary winding 32 for driving current detection, which is connected to the connection line installed between the induction motor 6 and the connector switch for drive 7, and the primary winding 48 for charging current detection, which is connected to the connection line installed between the charging terminal 19 and the connector switch for charge 20, are wound around the magnetic path 31. The number of turns of the primary winding 48 for charging current detection is greater than that of the primary winding 32 for driving current detection.

Operation of the embodiment shown in FIG. 16 is described hereunder.

When the current reference operating section 10 is to drive the induction motor 6, the system connects the connector switch for drive 7 according to the signal SWD and disconnects the connector switch for charge 20 according to the signal SWC. In this process, the same current as is supplied to the induction motor 6 flows through the primary winding 32 for driving current detection, and no current flows through the primary winding for charging current detection 48. As a result, the output voltage of the current detector 21 represents a value which corresponds to the number of turns of the primary winding 32 for driving current detection and to the intensity of the current flowing through the induction motor 6. This enables the system to control the current.

When the current reference operating section 10 is to charge the battery 9 with the power from the external power supply 2, the system connects the connector switch for charge 20 and disconnects the connector switch for drive 7. In this process, no current flows through the primary winding 32 for driving current detection of the current detector 21 but a current flows through the primary winding 48 for charging current detection. As a result, the output voltage of the current detector 21 represents a value which corresponds to the number of turns of the primary winding 48 for charging current detection and to the intensity of the charging current. Because number of turns of the primary winding 48 for charging current detection is greater than that of the primary winding 32 for driving current detection, the output voltage of the current detector 21 generated from the same current when charging is greater than that when driving.

The abovementioned specific embodiment shown in FIG. 16 provides the same effect as is achieved in FIG. 1. Moreover, in the embodiment shown in FIG. 16, it is possible not only to control the current always accurately but to reduce the number of components required and miniaturize the control system because the current detection range can be changed only by one current detector 21 and without using the current change section 11.

Although an electric automobile driven by induction motor is described in each of the abovementioned examples, this invention can be applied to an electric automobile driven by synchronous DC motor or AC motor. And, although the examples cover only the systems using two current detection ranges, this invention can also be applied to a system using more than two ranges, wherein, for example, the detection range for the charge control is divided into two; one for quick charging and another for normal charging. The invention is also applicable to an electric automobile driven by multiple motors.

In the embodiment shown in FIG. 1, wherein the system checks whether the current detectors 21 and 22 are failed or not, it is possible to employ a configuration so as to let the system to change over to the current detector 21 or 22, whichever normal, when a failure is detected. For this, an emergency switch is installed between the contact point of the input terminal 19 and the detector 22 and the contact point of the induction motor 6 and the switch 21. This emergency switch is normally set open but if, for example, a failure is detected in the detector 22 when charging, the switch 20 is turned off and both the switch 7 and the emergency switch are turned on. Thus, the current from the power supply 2 is supplied to the battery 9 by way of the emergency switch, the detector 21, the switch 7, and the inverter 3. If a failure is detected in the detector 21 when driving, the switch 7 is turned off and both the switch 20 and the emergency switch are turned off. Thus, the current from the inverter 3 is supplied to the induction motor 6 by way of the switch 20, the detector and the emergency switch. The system is designed so that the current reference operating section 10 or the current control section 12 decides whether the detectors 21 and 22 are failed. It is also possible to design the system so that occurrence of a failure, when it happens, may be displayed to the driver with the aid of an appropriate displaying means.

Although the power supply 2 is installed outside of the vehicle in the abovementioned embodiments, it may be mounted inside the vehicle. For example, this invention is applicable also to an automobile, such as a hybrid car, with a gasoline engine, a battery and an electric motor mounted, wherein the power is generated by the gasoline engine and the generated power is supplied to the battery.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control system for an electric automobile having a driving force unit for driving said electric automobile, a power storage unit for storing power to be supplied to the driving force unit, and a power converter for converting the power provided from the power storage unit to the driving force unit, said control system comprising:

a current detector for detecting current of said power converter, said current detector comprising a magnetic path having multiple windings wound in common thereon, each of said windings having a different number of turns and a different detection range, and a switching unit for selecting a detection range from among the respective detection ranges of said multiple windings; and a control unit for controlling selection of one of the current detection ranges of the current detector according to a control state of the electric automobile, and for controlling the power converter in response to the output signal of the said current detector within the selected current detection range.

2. The control system for electric automobile of claim 1 wherein said power converter converts power from a power supply installed outside of the electric automobile and supplies it to the said power storage unit, said control unit switches the current detection range between a mode for driving the electric automobile and a mode for charging the power storage unit, and computes current necessary for driving when in a drive mode and computes current necessary for charging when in a charge mode.

3. The control system for electric automobile of claim 2 wherein the current detection range in the charge mode is narrower than the current detection range in the drive mode.

4. The control system for electric automobile of claim 2 wherein the current detector detects the current between the power converter and the driving force unit and between the power converter and the external power supply.

5. A control system for an electric automobile having a driving force unit for driving said electric automobile, a power storage unit for storing power to be supplied to the driving force unit, and a power converter for converting the power provided from the power storage unit to the driving force unit, said control system comprising:

a current detector, having multiple current detection ranges, for detecting current of the power converter; and a control unit for selecting any one of the multiple current detection ranges of the current detector according to a control state of the electric automobile, and for controlling the power converter in response to the output signal of the current detector within the selected current detection range;

wherein said current detector comprises a current transformer having multiple windings, each having a different number of turns, and a switching unit for selecting any one of said windings, and wherein one of the multiple current detection ranges is selected accordingly as the switching unit is changed over by the said control unit.

6. The control system for electric automobile of claim 5 wherein said power converter converts power from a power supply installed outside of the electric automobile and supplies it to the said power storage unit, said control unit switches the current detection range between a mode for driving the electric automobile and a mode for charging the power storage unit, and computes current necessary for driving when in a drive mode and computes current necessary for charging when in a charge mode.

7. A control system for electric automobile having a driving force generating unit for running and driving an electric automobile, a power storage unit for storing the power to be supplied to the driving force generating unit, and a power converter for converting the power provided from the power storage unit to the driving force generating unit, and for converting the power provided from a power supply to charge the power storage unit, the control system comprising:

a current detector including a first winding for detecting current flowing to the driving force generating unit and a second winding, having different number of turns than the first winding, for detecting current from the power supply; and a control unit for controlling the power converter in response to a detection signal from the first winding of the current detector when the electric automobile is run and driven, and for controlling the power converter in response to a detection signal from the second winding of the current detector when the power storage unit is charged.

8. The control system for electric automobile of claim 7 wherein the number of turns of said second winding is greater than the number of turns of said first winding.

9. A control method for electric automobile having a driving force unit for driving said electric automobile, a power storage unit for storing power to be supplied to the driving force unit, a power converter for converting power provided from the power storage unit to the driving force unit, and a control unit, said method comprising:

detecting current of the power converter by a current detector comprising a magnetic path having multiple windings wound in common thereon, each of said windings having a different number of turns and a different detection range, and a switching unit for selecting said detection range from among the detection ranges of said multiple windings;

controlling selection of one of the current detection ranges of the said current detector according to the control state of the electric automobile; and controlling the power converter in response to the output signal of the current detector.

10. A control method for electric automobile having a driving force unit for driving said electric automobile, a power storage unit for storing power to be supplied to the driving force unit, a power converter for converting power provided from the power storage unit to the driving force unit, and a control unit, wherein the power converter converts power from an external power supply installed outside of the electric automobile and supplies it to the power storage unit, comprising:

deciding whether the current state of the electric automobile is a drive mode or a charge mode;

connecting the power converter and the driving force unit electrically and controlling the driving force of the driving force unit when the state is decided to be the driving mode;

changing over a current detection range according to whether the electric automobile is in the drive mode or the charge mode, and detecting driving force control current;

computing a current necessary for driving when in the drive mode, and controlling the power converter according to a result of this operation; and disconnecting the power converter and the driving force unit electrically when in the charge mode, and then connecting power from the external power supply to the power storage unit via the power converter, computing a current necessary for charging, and controlling the power converter according to a result of the operation.

* * * * *